United States Patent Office 2,983,955
Patented May 16, 1961

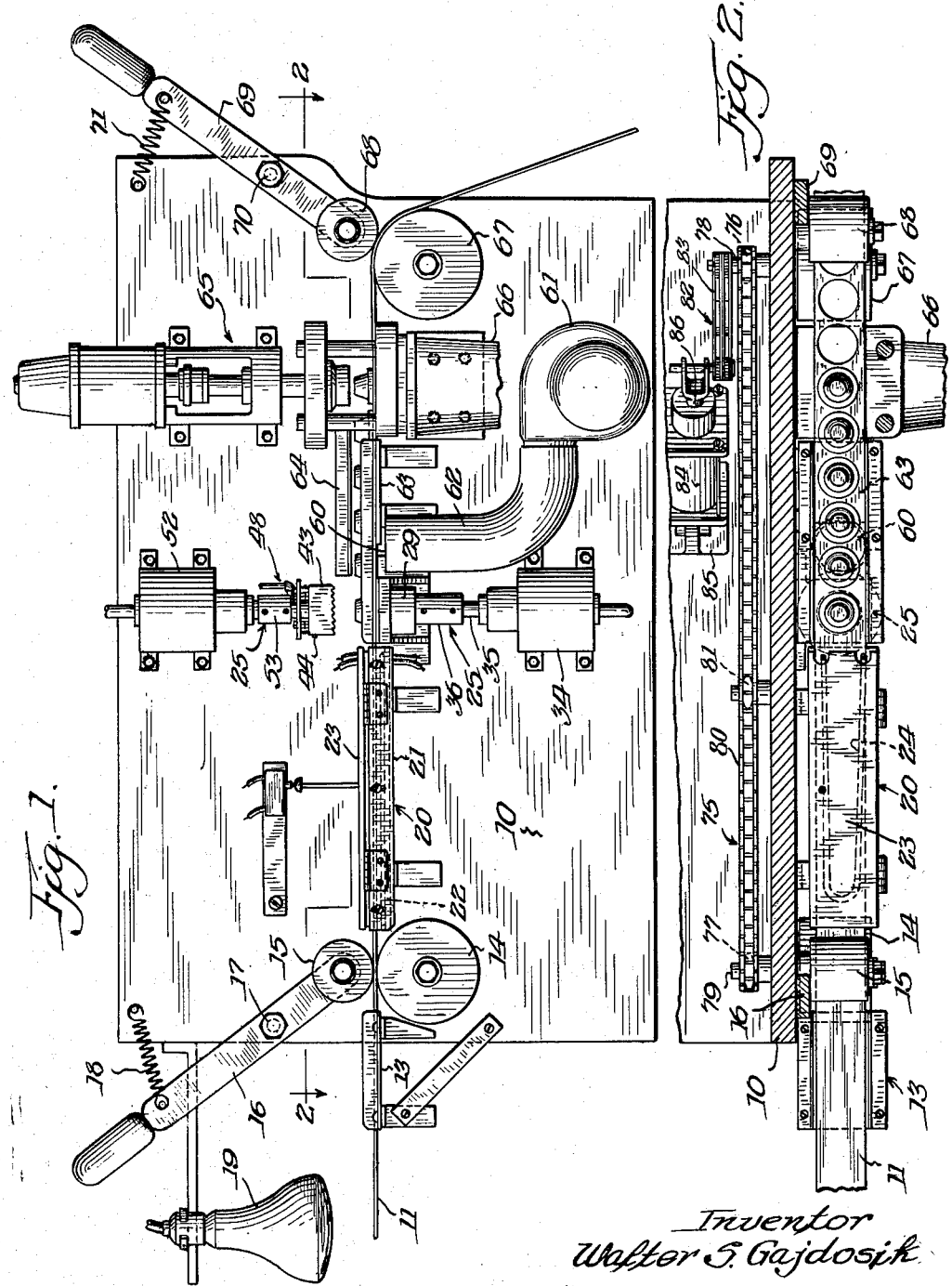

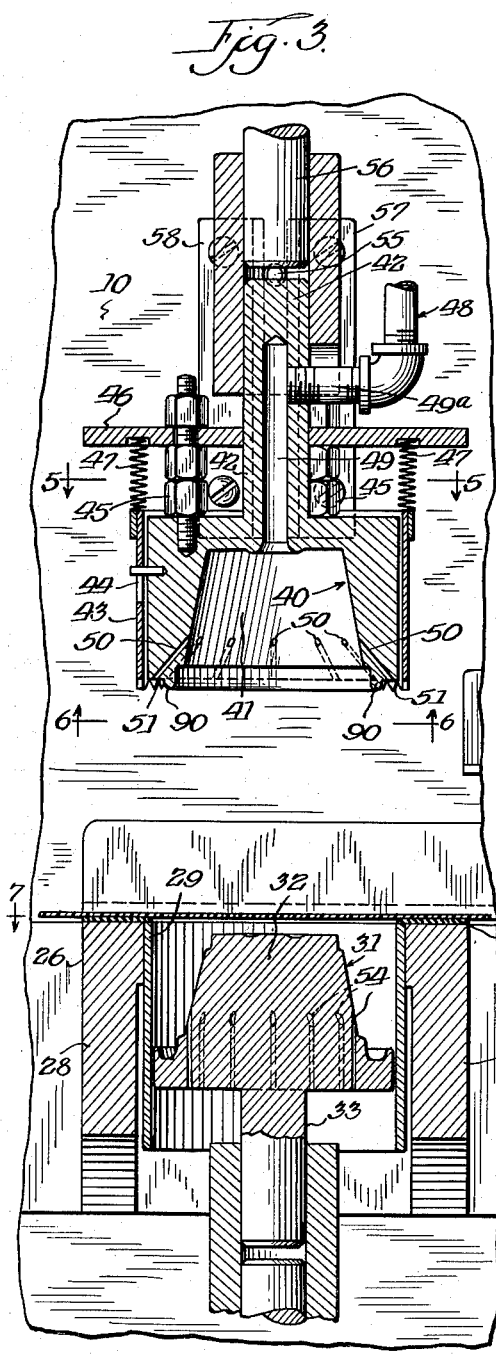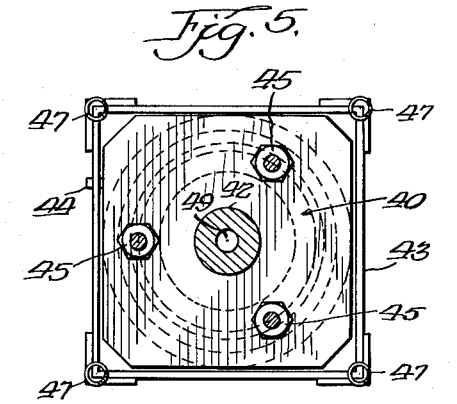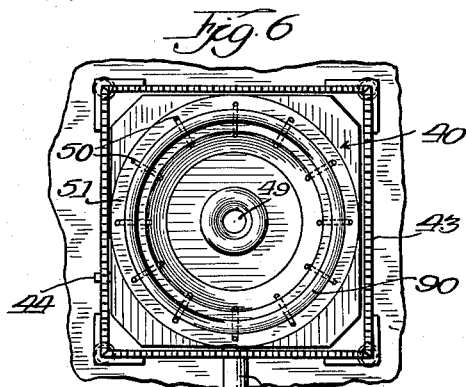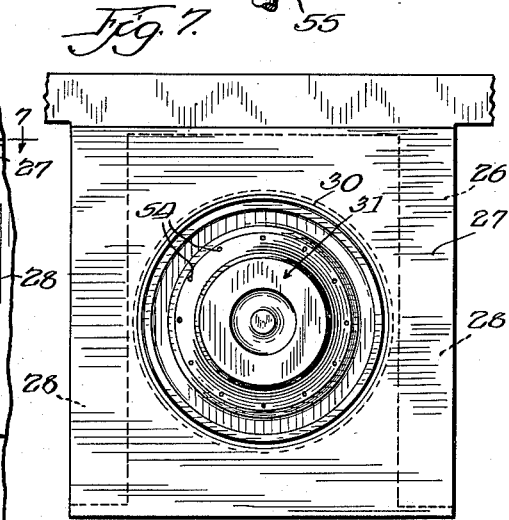
Inventor.
Walter S. Gajdosik.
By Merriam, Lorch, & Smith.
Attys.

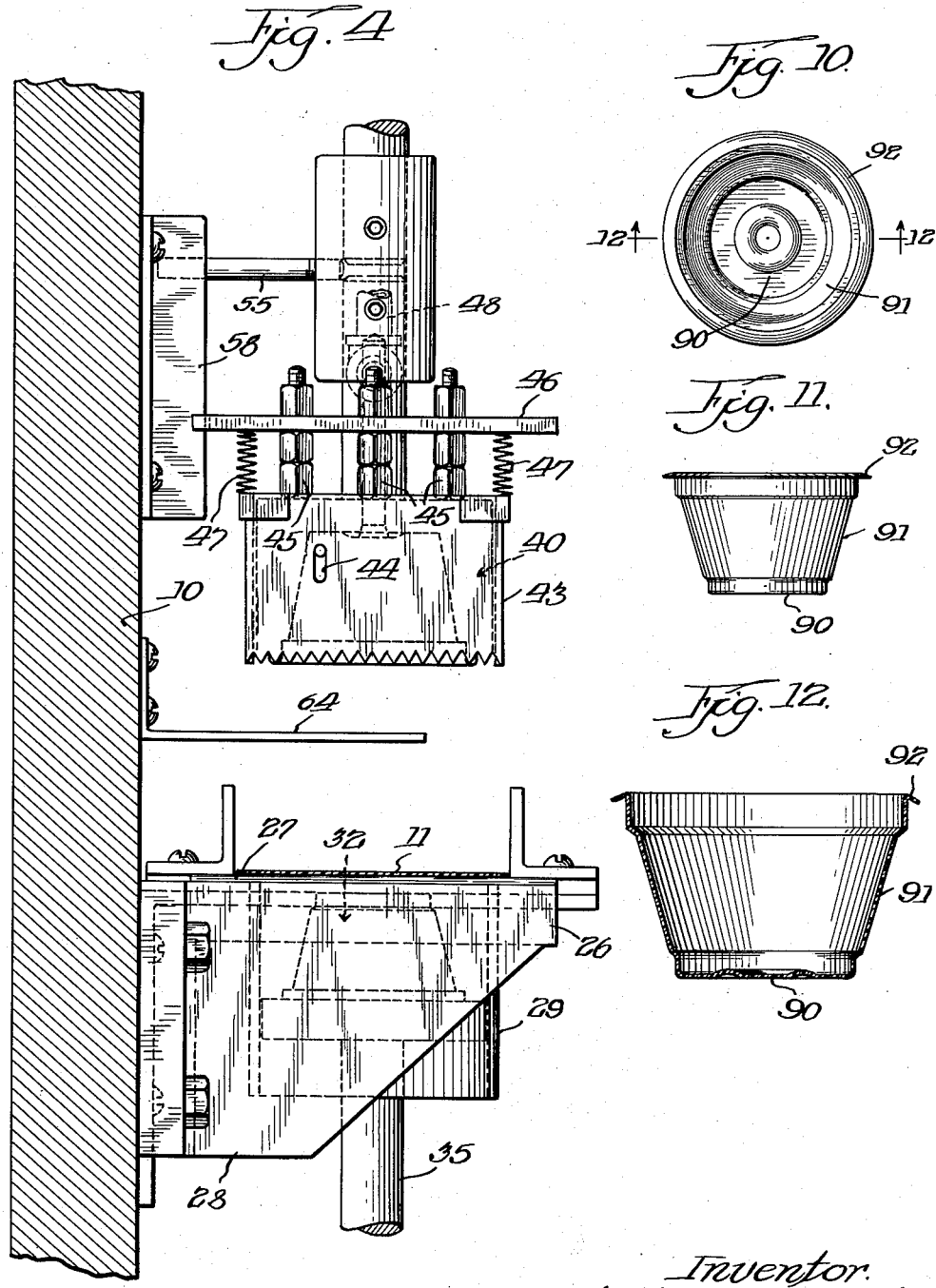

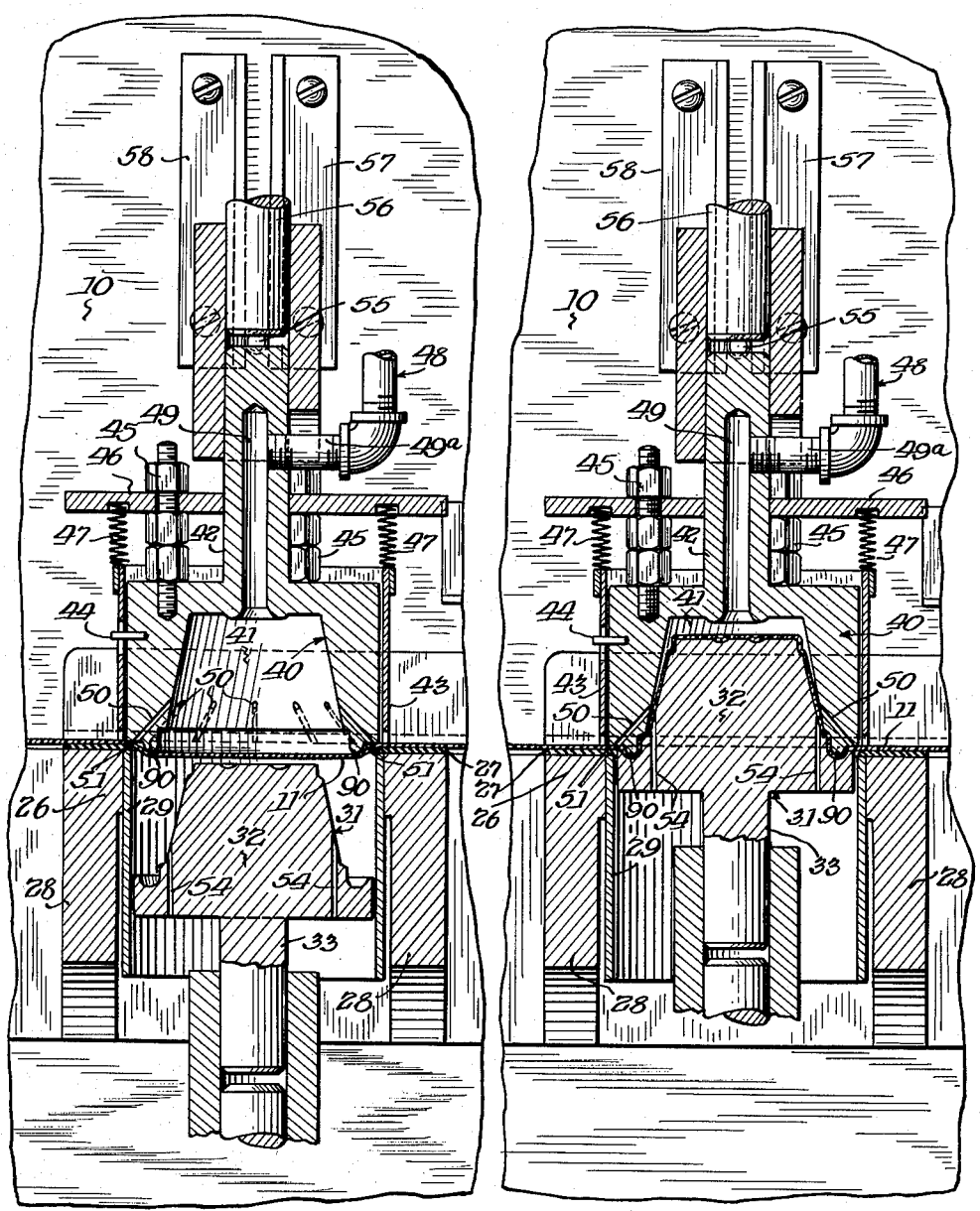

2,983,955

METHOD AND APPARATUS FOR FORMING THERMOPLASTIC PLASTIC

Walter S. Gajdosik, 1848 W. 47th St., Chicago, Ill.

Filed Aug. 25, 1958, Ser. No. 756,858

13 Claims. (Cl. 18—19)

This invention relates to a method and apparatus for the forming of thermoplastic thin gauge sheet plastic. It is especially directed to the forming of thin wall plastic containers having substantially uniform wall thicknesses.

With the availability of a variety of plastic sheet materials adaptable to forming operations, a number of forming processes have been developed for the production of a large number of items fabricated from plastic sheets. The forming of plastic sheets, which is a separate field in plastic molding methods, employs the basic principle of heating and thereby softening a plastic film or sheet. In the softened state, the sheet is forced into or against a mold and thereby shaped to its contours. Upon cooling the sheet will retain the shape of the mold.

A number of forming techniques have been developed for applying an external pressure against the softened sheet to force it against the mold. In these techniques the molding pressures are applied to the sheet by fluids at subatmospheric or superatmospheric pressure, or by mechanical forces. In conventional fluid pressure or mechanical forming techniques employed in the sheet forming processes, limitations exist with respect to the extent to which the plastic sheets can be drawn. In the conventional fluid pressure or mechanical forming processes, especially in the processing of thin sheets having thicknesses within the range of 0.005 to 0.040 inch, limitations are provided because of the extreme reduction in thickness in the bottom portions of the drawn forms. For example, in a fluid pressure formed piece fabricated from a sheet plastic 0.015 inch thick a draw of approximately ⅛ inch produced a bottom wall 0.003 inch thick. Further disadvantages in the use of conventional forming operations exists especially in the forming of unit packages containers which are subsequently filled with a selected commodity and sealed with a suitable closure. For shipping purposes the formed, unfilled containers are nested one within the other. In fluid pressure formed pieces of this nature, configurations are produced which will result in the locking of the individual pieces and make their separation for further use difficult. Although thin wall packages can be made by injection or compression molding, the finished piece tends to be brittle. In addition, this type of forming is expensive and not adaptable for the production of large numbers of small parts or pieces.

According to this invention there has been found a method and apparatus for the molding of plastic sheets which can rapidly and economically produce molded articles having wall thicknesses which differ only slightly from the thickness of the sheet employed in the forming operation. For example, by the forming operation of this invention thickness reductions in the walls of the formed piece of not greater than about 30% are produced in formed articles having high profiles wherein the formed part is produced employing a 0.65 to 1 ratio of depth to diameter.

In carrying out the instant invention a two stage drawing operation is employed. The sheet material is initially heated to a suitable forming temperature which, in general, will depend upon the type of material being employed but which is approximately at the minimum softening point of the plastic. The softened plastic sheet is clamped in position over the anvil member of the die and a suitably formed die brought into contact with the softened sheet to draw it into the anvil cavity within the range of about 5–50% of the depth of the finished piece, the depth of initial draw being inversely proportional to the depth of final draw. The initial drawing is effected by the female element of the die set, the female element being provided with a suitable protuberant flange at the marginal edge surrounding the female cavity to effect the initial drawing. A male die element having the desired configuration of the finished shape, substantially similar to the cooperating cavity of the female forming die, is pushed upwardly against the drawn material to effect about 60–85% of the final forming. In order to finish the operation, a fluid pressure is applied to the outside of the partially formed piece by forcing air or other suitable fluid into the cavity remaining after the male element of the die has been seated against the female die element. Sufficient air pressure is utilized to force the unformed portion of the softened plastic sheeting against the male die element to complete the finished piece. The fluid under pressure leaves the cavity and is jetted across the formed piece adjacent the seam between the registered die elements by means of suitable ports provided in the female die element to expedite the cooling of the formed plastic in this area. After the piece has been formed, the die elements disengage and the finished piece is introduced into a cooling air stream to reduce further the temperature of the material to about ambient room temperature. Thereafter the cooled piece leaves the mold cavity in web form and the pieces can be separated by feeding the web into an automatic cutter or, in the case of packaging, directly into loading equipment.

To carry out the process of this invention a preferred embodiment of the apparatus used is shown in the attached drawings in which:

Figure 1 is a front elevation view of a complete plastic forming apparatus utilized in the production of unit package containers.

Figure 2 is a top plan view along line 2—2 of the apparatus shown in Figure 1.

Figure 3 is a cross sectional elevation view of the male and female forming dies of one embodiment of the die set of this invention.

Figure 4 is a side view of the die set shown in Figure 3.

Figure 5 is a cross sectional view of the female forming die element through line 5—5 of Figure 3.

Figure 6 is a bottom view through line 6—6 of the female forming die shown in Figure 3.

Figure 7 is a top view through line 7—7 of the male forming die and anvil elements of the die set shown in Figure 3.

Figures 8 and 9 show the positions of the male and female die forming elements in the initial and final drawing stages, respectively, of the instant invention.

Figure 10 is a top view of an illustrative formed plastic product produced by the apparatus of this invention.

Figure 11 is a side elevation view of the product illustrated in Figure 10.

Figure 12 is a cross section view of the product illustrated in Figure 10 through the line 12—12 of Figure 10.

Referring to the drawings, the illustrative apparatus embodiment shown therein adapted for the forming of thin gauge vinyl plastic sheeting comprises an upright standard 10 upon which is mounted the various elements of the forming apparatus. In this embodiment, sheet stock 11 is fed from a roll, not shown, which is supported on a suitable cradle. The sheet is drawn over feed tray 13 and passes between traction roll 14 and hold down roll 15, both of which are preferably faced with a friction increasing surface. Traction roll 15 is mounted on a spring loaded arm 16 which is pivoted at point 17. Spring 18 which is secured to arm 16 and upright standard 10 urges hold down roll 15 into contact with the plastic strip forcing it against traction roll 14 which is periodically angularly displaced by a suitable indexing mechanism to advance the plastic a predetermined amount. A thermostatically controlled heating means, such as infra red lamp 19, held in position by a suitable bracket, is provided to preheat the plastic strip to about ambient room temperature (<75° F.) prior to passing the strip into oven 20. Oven 20 comprises a bottom portion 21 in which is embedded an electrically powered heating element 22 and a cover 23 hinged to bottom portion 21. An electrical heating element 24 is also provided in cover 23. The electrical heaters are connected to a power source not shown. Oven 20 heats the strip during its progress therethrough to an elevated temperature at which the plastic strip is in a softened condition. In its softened condition the plastic strip is moved into position for forming by means of die set 25. Forming the die set 25 shown in Figures 3–9 is anvil 26 which is faced with an elastomeric fabric 27 such as rubber to provide a surface to hold the plastic sheeting in position for the forming operation. Anvil 26 is secured to upright standard 10 by means of brackets 28. Reciprocatively installed in tubular guide chamber 29 which is dependently mounted within the bore 30 provided in anvil 26 is male die element 31 which comprises the forming die head 32 and an integral shank member 33. Male die element 31 is reciprocatively actuated by means of ram 34 which has a conventional piston operated shaft 35 which is coupled to shank 33 by means of sleeve coupling 36. Female die element 40 consists of a female forming die head 41 which cooperates with male forming die head 31. Integral with die head 41 is shank 42. Surrounding die head 41 is a spring-loaded holding-down clamp 43 which is retained in position on die head 41 by means of pin and slot connection 44. Affixed to die head 41 and spaced therefrom by means of suitable spacers 45 is outwardly depending flange 46 which functions as a spring holding plate for springs 47 which bear against the marginal edge of clamp 43. The cavity of female die head 41 is provided with air inlet 48 which enters through the top of the cavity by means of passageway 49 longitudinally provided in shank 42. A lateral extension 49a connects the passageway with outlet means 48, such as a threaded pipe. Air outlet means are also provided in the cavity by means of ports 50 which extend from the cavity of female die head 41 to shoulder portion 51 thereof.

Shank 42 is coupled to the operating shaft of hydraulic ram 52 by means of coupling 53 which is provided with a suitable slot through which lateral extension 49a passes in order to connect with air inlet 48.

As shown in Figures 8 and 9, male forming die head element 32 in cooperation with the cavity in female forming die head 41 coacts to partially form the cup shaped piece, the finished forming being effected by means of air pressure introduced into the cavity through inlet 48. The air introduced leaves the cavity through ports 50 and in passing to the atmosphere effects the cooling of the formed plastic sheet adjacent the outlets of ports 50. A substantial cooling effect is also accomplished during the air forming operation by the passage of cool air across the formed surface of the plastic sheet. In order to release any air which is entrapped between the plastic sheet and the male forming die head 32, ports 54 are provided through which any entrapped air can be exhausted to the atmosphere in order to prevent the formation of air bubbles in the finished piece. In order to guide the female die element 40 in its reciprocating movement, a suitable guide means, such as pin 55 laterally depending from the back of collar 53, is provided. Pin 55 engages with slot 56 formed by opposed metal angles 57 and 58 which are suitably mounted on the face of upright standard 10.

Upon disengagement of the die head elements 32 and 41 the formed piece is moved into position over blower outlet 60 through which cooling air is sent by means of blower 61 and blower conduit 62. The cooling air, which is passed over the surfaces of the shaped piece, further cools the piece to about ambient temperature and thereby prevents any distortion of the formed piece. In order to retain the formed pieces in position on shelf 63, a hold down plate 64 is provided.

In the illustrative embodiment shown in the drawings, shelf 63 has an extent sufficient to hold five formed cups prior to the punch operation for the severance of the piece from the plastic web. The time element involved for the passage of a formed piece of vinyl plastic sheeting along the length of shelf 63 operating at a production rate of 30 pieces per minute is sufficient to effect any further cooling to ambient temperature which might be necessary and which was not effected by the passage of cooling air from the blower outlet 60. At the end of the cooling cycle, the formed piece, still attached to the web, is fed into a conventional automatic cutter 65, such as a blanking die, and severed therefrom and discharged from the machine by means of chute 66, shown in fragmentary form, which empties into a suitable storage container, not shown. The forward movement of the shaped strip is assisted by means of a second set of traction roll 67 and hold down roll 68. In order to compensate for the dimensional increase in the plastic sheeting resulting from the heating cycle, it is necessary, in order to maintain an even movement of the sheet without buckling, to provide traction roll 67 with a diameter slightly larger than that of traction roll 14. Hold down roll 68 functions to bring the remainder of the web into frictional engagement with traction roll 67 and functions in the same manner as traction roll 15. Traction roll 68 is rotatably mounted on one end of arm 69 which is pivotally mounted at point 70 to upright stand 10. Arm 69 is spring loaded by means of spring 71 which urges traction roll 68 toward traction roll 67. The remnant of plastic strip 11 is removed from the apparatus and scrapped.

To effect the automatic indexing of the plastic strip into the several stations a chain and sprocket drive 75 shown in Figure 2 is employed. Sprockets 76 and 77 which are respectively attached to drive shafts 78 and 79 of traction rolls 67 and 15 are connected by means of chain 80. An idler sprocket 81 is also provided. To provide an indexing cycle ratchet movement 82 is integrally joined to drive shaft 78. The actuation of arm 83 is effected by hydraulic ram 84 which is pivotally attached to base 85. The to and fro motion of arm 83 produced by the reciprocating movement of drive shaft 86 moves the plastic strip a specified amount into the various stations.

The control of each individual operation is preferably done automatically by suitable control devices. The various mechanisms are preferably actuated by compressed air because air operated devices provide long strokes and variable speeds desirable for flexible machine operation.

In employing the above described illustrative embodiment in carrying out the process of this invention, a vinyl plastic strip is fed into oven 20 wherein it is heated to an elevated temperature of about its softening point. The heated vinyl plastic strip is moved into forming position intermediate the male and female forming dies 31 and 40 of die set 25. The female die head 41 moves downwardly and the marginal edge of holding-down clamp 43 depending downwardly below the face of die head 41 initially engages the softened sheet of plastic to hold it firmly in place. Female forming die head 41 continues downwardly and by means of downwardly depending beaded flange peripherally surrounding the cavity in female die head 41 effects an initial draw of the softened plastic sheet into the bore in anvil 26, as shown by Figure 8. It is seen from this operation that the female die head 41 has a dual function in that it initially operates as a male forming die to effect an initial drawing of the plastic sheet and thereafter as a female forming die to cooperate with male die head 31 in the final forming of the pieces being shaped by the apparatus of this invention. After female forming die head 41 comes to rest with a portion of shoulder 51 resting on the face of anvil 26, male forming die head 31 moves upwardly into contact with the drawn portion of the softened plastic sheet moving it upwardly into the cavity of female die head 41. Upon completion of its upward travel, cooling air at about atmospheric temperature is introduced into the cavity of female die head 41 by means of air inlet 48. This air is at an elevated pressure, e.g. 120 p.s.i.g., and serves to effect that portion of the plastic sheet forming which is not accomplished by the engagement of the male and female forming dies, 31 and 40. The air forced into the cavity exits therefrom by means of ports 50, escaping therefrom into the surrounding atmosphere because a fluid tight seal is not effected by the engagement of shoulder 51 with the softened plastic. There is provided, however, resistance to air flow at this point to provide a back pressure sufficient to bring about the finished forming of the piece being shaped, e.g. about 75 p.s.i.g. In addition to forming, the air functions to chill the softened plastic in the area where dimensional tolerances are critical. In the illustrative cup, shown in Figures 10–12, formed by the above described apparatus, it is necessary to retain dimensional stability at the open end of the cup in order to permit the insertion of a cover disk. By chilling the softened plastic sheet during the forming, the opening will be hardened sufficiently to avoid forming an out-of-round opening. The cooling air which passes through cavity also helps to cool the female forming die 41. Fluid pressures employed in this operation will in general depend upon the thickness of the plastic sheeting. Air pressure sufficient to create back pressures within the range of about 50–150 p.s.i.g. will be satisfactory.

After the piece has been formed, the forming die members separate sufficiently to permit the removal of the formed piece. Although a portion of the formed piece extends within the bore of anvil 27, the flow of cooling air passing from blower outlet 60 serves to unseat the formed piece and permit the forward movement of the plastic sheet. If, however, the initial draw exceeds about 10%, supplementary ejection means are employed to remove the formed piece from the anvil bore hole. The cooling air which issues from blower outlet 60 serves to cool the interior of the formed piece and bring the temperature of the formed piece to about ambient room temperature. After the formed piece has passed over blower outlet 60 a sufficient time interval, prior to separating the formed piece from the web of plastic sheet, is provided to air temper the formed piece. In passing through the cut off die in the apparatus shown in the illustrative embodiment, the formed piece is severed from the web of plastic sheet and removed from the apparatus.

It is to be noted that in fabricating the male and female forming die elements employed in the apparatus of this invention the cavity of the female forming die is larger than the cooperating male die forming member by an amount greater than the thickness of the plastic sheet being formed at the closed end of the cavity. The open space acts to dampen the eroding action of the incoming air. The volume of this space should be sufficient to permit the introduction of the forming and cooling air without distorting or deleteriously affecting the wall thickness of the plastic adjacent the air inlet port. The air which is introduced provides about 15 to 40% of the forming operation, with the remainder of the forming being effected by the cooperation of the male and female die forming elements. For example, in the illustrative die set a clearance of about 0.1 inch between the bottom of the cavity in the female die head and the top of the male die head was provided. The cooperating forming dies are fitted closely, however, at the open end of the cavity and the female forming die. The shoulder of the female forming die is provided with a drawing means such as a beaded flange, as illustrated, or other configuration such as a continuation of the inner surface of the piece formed which functions as a male drawing element to effect the initial drawing essential to the forming operation of this invention. The initial draw, depending upon the type of plastic, wall thickness, and depth of draw, will vary from about 5–50% of the draw provided on the finished piece. For example, in forming the cup shaped container shown in Figures 10–12, having a maximum inside diameter of 1½ inches which is formed from a plastic sheet 0.019 inch thick by means of a 1 inch final draw, an initial drawing operation of about 3/32 inch was carried out prior to the final draw by means of the female forming die. The position of the cooling ports, provided in the female forming die, will depend upon the configuration of the die cavity. Preferably they are spaced evenly about the periphery of the cavity and placed close enough to the air inlet so that the air ports will not become sealed by the plastic sheet forced against them by means of the male die forming member.

Accurately controlled heaters employing hot circulating fluids such as steam, hot water, etc., infra red lamps and other suitable heating means can be used in order to heat the plastic sheeting to the desired softening temperature. Generally, however, the most effective control can be provided by electrically heated ovens which can heat the plastic sheeting to the desired elevated temperature. The selected temperature to which the plastic is heated will depend upon the composition of the plastic used. For example, in processing a vinyl plastic 0.019 inch thick it is necessary to heat the plastic sheet to a temperature of about 160° F. Polyethylene of this thickness, for example, is formable at about 220°–240° F. Plastic sheeting other than vinyl has a tendency to adhere to the oven platen during the softening operation. Accordingly in oven designs for other plastics means for passing the sheeting through the oven chamber in spaced relation from the heating surfaces is required. In carrying out the subject invention it is unnecessary to heat the male and female forming die heads in preparation of containers for use as small unit packages. It may be desirable, however, in the forming of large plastic sheets to employ a temperature controlled male forming die head.

Coordination of the sequential operations employed in the process of this invention is carried out by conventional timing mechanism which provides for the timed sequence of operations. In the illustrative embodiment air pressure is utilized to operate the air rams employed for the reciprocating motion of the forming dies and indexing mechanism as well as the operation of the cut-off die. It is apparent however that other hydraulic or mechanical techniques can be utilized in the operation of these elements. The longitudinal and intermittent motion of the plastic sheet into alignment with the various operation stations is carried out by a suitable indexing arrangement.

Although the speed of operation is affected by the time required to completely harden the plastic sheet after it has been formed, it is apparent that if increased output is desired a number of machines can be operated in tandem which, because of the ease of operation of the method and apparatus of this invention, can be operated by a single operator whose primary function is to provide a constant supply of feed material as well as remove the finished product. In the event that the process and apparatus of this invention are utilized in the formation of unit packages, it is preferred to feed the finished parts, still in web form, directly into suitable loading equipment which automaticaly fills the cavity of the formed pieces with the substance to be packaged therein. Sealing of the filled containers can be effected by heat sealing or adhesive sealing a thin film of thermoplastic material to the web portion of the formed piece and thereafter severing the filled and sealed package from the web. In the alternative, the finished pieces can be cut off from the plastic web prior to filling and loaded into a conveyor system provided with suitable apertures for holding the formed pieces. In this operation conventional sealing techniques can also be utilized. Although the subject invention is particularly adaptable to the automatic forming of unit packages employing plastic sheets varying in thickness from about 0.005 inch to about 0.040 inch, it has broad application in the production of formed pieces from other thicknesses of plastic up to about 0.25 inch or thicker, including containers; refrigerator, furniture and kitchen accessories; toys etc. The instant invention can be used for the production of low profile or high profile products having a ratio of 0.25–2 to 1, but is especially adaptable to draws having a ½–1 to 1 ratio of depth to diameter without greatly reducing the side wall thickness of the plastic sheeting employed. Mold shapes having straight or tapered side walls can be used. It is preferred, however, to use male plugs with not less than about 1° of taper in the sides.

Thermoplastic materials which can be processed in the instant invention include polyethylene; polytetrafluoroethylene; polystyrene; various vinyl plastics such as polyvinyl chloride, vinyl chloride-acetate copolymers, and the like; cellulosics such as cellulose acetate, cellulose nitrate; and others.

The plastic sheeting or film which is used can be prepared according to the conventional techniques of extruding, film casting, calendering, or the like. In utilizing sheeting which has been prepared by calendering wherein the film or sheeting is produced by rolling a heated softened plastic between rollers to achieve its desired thickness, it is preferred that unoriented sheeting be used which has been longitudinally calendered in order to provide maximum effectiveness. While oriented plastic sheeting can be utilized in the process of this invention, the forming process requires extensive clamping operations which hold the formed piece in tension during the cooling of the piece.

Plastic pieces formed in accordance with the subject invention are characterized by having greater wall thickness in the finished product than can be produced by conventional fluid pressure or mechanical sheet forming techniques. In the unit package illustrated in Figures 10–12, which is formed by means of the illustrative apparatus and method, an unoriented vinyl plastic 0.019 inch thick was utilized. Produced by the forming operation of this invention, the bottom 90 of the formed piece will have a thickness of about 0.018 inch. The side wall 91 which is affected to the greatest degree by the forming operation will have a wall thickness of about 0.015 inch. The flange portion 92 of the formed piece will have a wall thickness of about 0.018 inch. The same product formed by conventional vacuum forming utilizing the same plastic sheeting would have a bottom wall thickness of about 0.003 inch.

Although the subject invention has been specifically described by the foregoing description, it is apparent that modifications in the subject invention will be apparent to those skilled in the art to which this invention pertains without departing from the scope of the invention and without the exercise of inventive faculties. For example, the fixed anvil of the illustrative embodiment could be replaced with a movable anvil secured to the male forming die, the male and female forming dies could be inverted, the formed product could be made to conform with the configuration of the female forming die with the fluid forming pressure emanating from the male plug, and others. It is therefore seen that a variety of equivalent alternatives can be utilized in the various operations carried out. Accordingly, the subject invention is to be limited only in the manner defined in the appended claims.

What is claimed is:

1. A method for forming a drawn, thin-walled article of manufacture from thermoplastic plastic sheeting employing a male forming die and a female forming die which comprises heating said sheeting to an elevated temperature below the melting point of the plastic sufficient to permit the forming of said sheeting, circumambiently clamping said sheeting in an area adjacent the portion of the sheeting which is to be formed, initially drawing said portion of said sheeting in a peripheral marginal area of the clamped portion a fractional amount of the total draw of said article, redrawing the initially drawn portion in a direction opposite to the initial draw to form a major part of the finished article, applying fluid pressure to the partially formed product to finish form said product to the configuration of one of said forming dies, cooling said piece to a temperature substantially below said elevated temperature whereby dimensional stability is obtained.

2. A method for forming a drawn, thin-walled article of manufacture from thermoplastic plastic sheeting employing a male forming die and a female forming die having a die cavity and a drawing means positioned adjacent the marginal edge of the open end of the cavity which comprises heating said sheeting to an elevated temperature below the melting point of said plastic sufficient to permit the forming of said sheeting, circumambiently clamping said sheeting in an area adjacent the portion of the sheeting which is to be formed, contacting said sheeting with the drawing means of said female forming die to initially draw the clamped portion of said sheeting in a peripheral marginal area immediately adjacent said drawing means a fractional amount of the total draw of said article, contacting the drawn portion with said male forming die to redraw the initially drawn portion into the cavity in said female forming die in a direction opposite to the initial draw to form a major part of the finished article, applying fluid pressure to the partially formed product while said male and female forming dies are in engagement to finish form said article to the configuration of one of said forming dies, cooling said piece to a temperature substantially below said elevated temperature whereby dimensional stability is obtained.

3. A method for forming a drawn, thin-walled article of manufacture from thermoplastic plastic sheeting employing a male forming die and a female forming die having a die cavity and a drawing means positioned adjacent the marginal edge of the open end of said cavity which comprises heating said sheeting to an elevated temperature below the melting point of said plastic but sufficient to permit the forming of said sheeting, circumambiently clamping said sheeting in an area adjacent the portion of the sheeting which is to be formed, contacting said sheeting with the drawing means of the female forming die to initially draw the clamped portion of said sheeting in a peripheral marginal area immediately adjacent said drawing means a fractional amount of the total draw of said article, contacting the drawn portion with the male forming die to redraw the initially drawn portion into the cavity in the female forming die in a direction opposite to the initial draw to form a major part of the finished article, applying fluid pressure to the partially formed product while said male and female forming dies are in engagement to finish form said product to the configuration of one of said forming dies, cooling said piece to a temperature substantially below said elevated temperature whereby dimensional stability is obtained.

4. A method in accordance with claim 3 in which said fluid pressure is applied into said cavity to produce a finished product conforming to the configuration of said male forming die.

5. A method for forming a drawn, thin-walled article of manufacture from thermoplastic plastic sheeting employing a male forming die and a female forming die having a die cavity and a drawing means positioned adjacent the marginal edge of the open end of the cavity and circumscribing said open end which comprises heating said sheeting to an elevated temperature below the melting point of said plastic sufficient to permit the forming of said sheeting, circumambiently clamping said sheeting in an area adjacent the portion of the sheeting which is to be formed, contacting the sheeting with the drawing means of said female forming die to initially draw the clamped portion of said sheeting in a peripheral marginal area immediately adjacent said drawing means a fractional amount of the total draw of said article, contacting the drawn portion with the male forming die to redraw the initially drawn portion in a direction opposite to the initial draw to form a major part of the finished article, applying air pressure into said cavity to the partially formed product while said male and female forming dies are in engagement to finish form said product to the configuration of said male forming die, partially releasing said air pressure at the junction of said female forming die and the unformed sheet whereby said female die is cooled and the formed portions of said article are cooled, separating said article from said forming dies and cooling the formed piece to a temperature substantially below said elevated temperature whereby dimensional stability is obtained.

6. A method for forming a drawn, thin-walled unit packaging container from thermoplastic plastic strip sheeting employing a male forming die having the configuration of said container and a female forming die having a cavity deeper than the height of the male forming die and a drawing means positioned adjacent the marginal edge of the open end of said cavity and circumscribing said open end which comprises longitudinally moving said strip into a heating zone, heating said sheeting during the passage of said strip through said heating zone to an elevated temperature below the melting point of said plastic sufficient to permit the forming of said strip, circumambiently clamping the strip in an area adjacent the portion of the strip which is to be formed, contacting the strip with the drawing means of said female forming die to initially draw the clamped portion of said strip in a peripheral marginal area immediately adjacent said drawing means a fractional amount of the total draw of said container, contacting the drawn portion with the male forming die to redraw the initially drawn portion in a direction opposite to the initial draw to form a major part of the finished container, applying air pressure to the partially formed product while said male and female dies are in engagement to finish form said container to the configuration of said male forming die, cooling said piece to a temperature substantially below said elevated temperature whereby dimensional stability is obtained.

7. An apparatus for forming a mechanically drawn and fluid pressure formed, thin-walled article of manufacture from thermoplastic sheeting which comprises a transport means for longitudinally and intermittently moving said sheeting; a means for heating said sheeting to an elevated forming temperature below the melting point of said plastic; a die set comprising a male forming die, a cooperating female forming die, said male die and said female die being relatively reciprocating, clamping means for retaining said sheeting in forming position between the male and female forming dies comprising an anvil having a planar surface and being provided with a bore hole in longitudinal alignment with said male and female forming dies and a hold down clamp for circumambiently clamping said sheeting on said planar surface in an area surrounding said bore hole, said female forming die being provided with a drawing means mounted adjacent the open end of said female forming die and raised beyond the face of said die, overlying the peripheral portion of said bore hole to move into engagement therewith, to draw said sheeting into said bore hole, whereby said drawing means draws a portion of said sheeting in a peripheral marginal area of the clamped portion a fractional amount of the total draw of said article, said male forming die adapted to register with said female forming die while the plastic drawing means of said female forming die is disposed in said bore hole, the configuration of said male forming die being similar to said female forming die and having a depth less than the depth of said cooperating female forming die whereby an internal cavity is formed while said male and female forming dies are in forming registration, inlet means for introducing a fluid under pressure into said internal cavity; and cooling means for cooling said sheeting to ambient atmospheric temperature.

8. An apparatus for forming a mechanically drawn and fluid pressure formed, thin-walled article of manufacture from thermoplastic sheeting which comprises a transport means for longitudinally and intermittently moving said sheeting; a means for heating said sheeting to an elevated forming temperature below the melting point of said plastic; a die set comprising a male forming die, a cooperating female forming die, said male die and said female die being relatively reciprocating, clamping means for retaining said sheeting in forming position between the male and female forming dies, said clamping means comprising a stationary anvil having a planar surface and being provided with a bore hole in longitudinal alignment with said male and female forming dies and a hold down clamp for circumambiently clamping said sheeting on said planar surface in an area surrounding said bore hole, said female forming die being provided with a drawing means mounted adjacent the open end of said female forming die and raised beyond the face of said die, overlying the peripheral portion of said bore hole to move into engagement therewith, to draw said sheeting into said bore hole, whereby said drawing means draws a portion of said sheeting in a peripheral marginal area of the clamped portion a fractional amount of the total draw of said article, said male forming die adapted to register with said female forming die while the plastic drawing means of said female forming die is disposed in said bore hole, the configuration of said male forming die being similar to said female forming die and having a depth less than the depth of said cooperating female forming die whereby an internal cavity is formed while said male and female forming dies are in forming registration, gas inlet means in the upper portion of said female forming die adjacent said cavity, and gas outlet means in the lower portion of said female forming die; and cooling means for cooling said sheeting to ambient atmospheric temperature.

9. An apparatus for forming a mechanically drawn and fluid pressure formed, thin-walled article of manufacture from thermoplastic sheeting which comprises a transport means for longitudinally and intermittently moving said sheeting; a means for heating said sheeting to an elevated temperature below the melting point of said plastic; a die set comprising a male forming die, a cooperating female forming die, said male die and said female die being relatively reciprocating, and an anvil provided with a bore hole in longitudinal alignment with said reciprocating male and female forming dies, said female forming die being adapted to move relatively toward said anvil, having a shoulder portion greater in extent than the opening in said bore hole and being provided with a drawing means depending from said shoulder portion circumscribing the marginal edge of the open end of said female forming die and raised beyond the face of said die overlying the peripheral portion of said bore hole, and cooperating with said bore hole to draw said sheeting into said bore hole whereby said drawing means draws a portion of said sheeting in a peripheral marginal area of the clamped portion a fractional amount of the total draw of said article, said male forming die adapted to register with said female forming die while said female forming die is in engagement with said anvil, the configuration of said male forming die being similar to said female forming die and having a depth less than the depth of said cooperating female forming die whereby an internal cavity is formed while said male and female forming dies are in forming registration, gas inlet means in the upper portion of said female forming die adjacent said cavity, and gas outlet means in the lower portion of said female forming die terminating in said shoulder portion, and clamping means for retaining said sheeting in position on said anvil; and cooling means for cooling said sheeting to ambient atmospheric temperature.

10. In an apparatus for forming a mechanically drawn and fluid pressure formed, thin-walled article of manufacture from thermoplastic sheeting, a die set comprising a male forming die, a cooperating female forming die, said male die and said female die being relatively reciprocating, clamping means for retaining said sheeting in forming position between the male and female forming dies comprising an anvil having a planar surface and being provided with a bore hole in longitudinal alignment with said reciprocating male and female forming dies, and a holding down clamp for circumambiently clamping said sheeting on said planar surface in an area surrounding said bore hole, said female forming die being provided with a drawing means mounted adjacent the open end of said female forming die and raised beyond the face of said die, overlying the peripheral portion of said bore hole to move into engagement with the bore hole of said anvil and draw said sheeting into said bore hole whereby said drawing means draws a portion of said sheeting in a peripheral marginal area of the clamped portion a fractional amount of the total draw of said article, said male forming die adapted to register with said female forming die while the plastic drawing means of said female forming die is disposed in said bore hole, the configuration of said male forming die being similar to said female forming die and having a depth less than the depth of said cooperating female forming die whereby an internal cavity is formed while said male and female forming dies are in forming registration, inlet means for introducing a fluid under pressure into said internal cavity.

11. In an apparatus for forming a mechanically drawn and fluid pressure formed, thin-walled article of manufacture from thermoplastic sheeting, a die set comprising a male forming die, a cooperating female forming die, said male die and said female die being relatively reciprocating, clamping means for retaining said sheeting in forming position between the male and female forming dies comprising an anvil having a planar surface and being provided with a bore hole in longitudinal alignment with said reciprocating male and female forming dies and a holding down clamp for circumambiently clamping said sheeting on said planar surface in an area surrounding said bore hole, said female forming die having a shoulder portion greater in extent than the opening in said bore hole and being provided with a drawing means depending from said shoulder portion mounted adjacent the open end of said female forming die and raised beyond the face of said die, overlying the peripheral portion of said bore hole to move into engagement with the bore hole of said anvil and draw said sheeting into said bore hole whereby said drawing means draws a portion of said sheeting in a peripheral marginal area of the clamped portion a fractional amount of the total draw of said article, said male forming die adapted to register with said female forming die while the drawing means of said female forming die is disposed in said bore hole, the configuration of said male forming die being similar to said female forming die and having a depth less than the depth of said cooperating female forming die whereby an internal cavity is formed while said male and female forming dies are in forming registration, gas inlet means in the upper portion of said female forming die adjacent said cavity, and gas outlet means in the lower portion of said female forming die terminating in said shoulder portion.

12. In an apparatus in accordance with claim 9 in which said die set comprises a male forming die having a frustoconical plug member and a female forming die having a frustoconical cavity cooperating with said plug member and a laterally depending shoulder portion.

13. In an apparatus in accordance with claim 11 in which said die set comprises a male forming die having a frustoconical plug member and a female forming die having a frustoconical cavity cooperating with said plug member and a laterally depending shoulder portion.

References Cited in the file of this patent

UNITED STATES PATENTS

| Re 23,171 | Borkland | Nov. 29, 1949 |
| 2,282,423 | Kopitke | May 12, 1942 |
| 2,468,697 | Wiley | Apr. 26, 1949 |
| 2,702,411 | Winstead | Feb. 22, 1955 |

FOREIGN PATENTS

| 1,134,142 | France | Nov. 26, 1956 |

OTHER REFERENCES

"Blow Molding" (Bailey), published in "Plastics," vol. 2, No. 4, April 1945, pages 70, 72, 74, 75, 118–120 (see particularly Fig. 3B).